United States Patent
Troughton et al.

(10) Patent No.: US 10,668,874 B1
(45) Date of Patent: Jun. 2, 2020

(54) CLAMP ASSEMBLY FOR ELECTRICAL WIRING HARNESSES

(71) Applicant: United Technologies Corporation, Farmington, CT (US)

(72) Inventors: Andre Herman Troughton, Windsor Locks, CT (US); Ryan K. Snyder, Glastonbury, CT (US); Jose A. Carrion, San Juan, PR (US); Alexander Trabal, Anasco, PR (US); Jimmy C. Pujols, San Sebastian, PR (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/359,184

(22) Filed: Mar. 20, 2019

(51) Int. Cl.
| | | |
|---|---|---|
| *B60R 16/02* | (2006.01) | |
| *F16B 2/02* | (2006.01) | |
| *H02G 3/32* | (2006.01) | |

(52) U.S. Cl.
CPC ...... *B60R 16/0222* (2013.01); *B60R 16/0215* (2013.01); *F16B 2/02* (2013.01); *H02G 3/32* (2013.01); *F16C 2360/23* (2013.01)

(58) Field of Classification Search
CPC ......... F16B 2/02; H02G 3/32; F16C 2360/23; B60R 16/0222; B60R 16/0215
See application file for complete search history.

(56) References Cited

U.S. PATENT DOCUMENTS

| | | | | |
|---|---|---|---|---|
| 2,179,406 | A * | 11/1939 | Fitzpatrick | F16L 3/221 248/68.1 |
| 3,844,573 | A | 10/1974 | Wright et al. | |
| 5,271,588 | A * | 12/1993 | Doyle | F16L 3/237 248/68.1 |
| 6,392,147 | B1 | 5/2002 | Hier et al. | |
| 7,806,374 | B1 * | 10/2010 | Ehmann | H02G 3/22 174/40 R |
| 7,887,260 | B2 | 2/2011 | Courbis | |
| 8,684,321 | B2 | 4/2014 | Shirakabe et al. | |
| 8,910,912 | B2 | 12/2014 | Child et al. | |
| 9,590,401 | B2 | 3/2017 | Landry et al. | |
| 2004/0217236 | A1* | 11/2004 | Shibuya | F16L 3/13 248/68.1 |
| 2012/0153095 | A1* | 6/2012 | Child | F16L 3/2235 248/68.1 |

(Continued)

OTHER PUBLICATIONS

STIC search results (Year: 2020).*

(Continued)

*Primary Examiner* — Steven T Sawyer
(74) *Attorney, Agent, or Firm* — Bachman & LaPointe, P.C.

(57) ABSTRACT

A clamp assembly includes a grommet with a non-circular aperture with a multiple of crush apertures defined at least partially around the non-circular aperture. A method of supporting a wiring harness within a clamp assembly for a gas turbine engine includes installing a wiring harness through a non-circular aperture with a multiple of crush apertures defined in an arc at least partially around a major axis of the non-circular aperture; and compressing the grommet to compress the multiple of crush apertures to retain the wiring harness within the non-circular aperture.

21 Claims, 9 Drawing Sheets

(56) References Cited

U.S. PATENT DOCUMENTS

2015/0047147 A1* 2/2015 Vaccaro ................ H02G 3/32
 16/2.1
2017/0030487 A1* 2/2017 Sampson .............. F16L 3/1083

OTHER PUBLICATIONS

Esterline Engineered Materials, Bulletin 3000: Line Support Blocks, 2018, pp. 1-6, Valencia, CA, http://www.esterline.com/Portals/8/TA/PDF/Products/Clamps/3000-Line_Support_Blocks%202018.pdf.

* cited by examiner

CLAMP ASSEMBLY FOR ELECTRICAL WIRING HARNESSES

BACKGROUND

The present disclosure relates to a clamp assembly and, more particularly, to a clamp assembly for electrical wiring harnesses.

Wire harnesses are mounted at multiple locations and are routed along a gas turbine engine case structure by clamp assemblies. The clamp assemblies typically utilize rubber grommets with sheet metal brackets. The grommet is retained by bent sheet metal tabs riveted to the sheet metal bracket structure. Conventional rubber silicon grommet block clamps are effective, but may not provide an effective grip on the electrical harness during engine deflections and may eventually result in wire harness chafing.

SUMMARY

A clamp assembly according to one disclosed non-limiting embodiment of the present disclosure includes a grommet comprising a non-circular aperture with a multiple of crush apertures defined at least partially around the non-circular aperture.

A further embodiment of any of the foregoing embodiments of the present disclosure includes that the non-circular aperture is an oval.

A further embodiment of any of the foregoing embodiments of the present disclosure includes that the non-circular aperture defines a major axis and a minor axis, the multiple of crush apertures arranged in an arc.

A further embodiment of any of the foregoing embodiments of the present disclosure includes that each of the multiple of crush apertures are racetrack in shape.

A further embodiment of any of the foregoing embodiments of the present disclosure includes that the multiple of crush apertures are each sized with respect to the minor axis such that the height measured radially outwardly from a center of the wire harness aperture of each of the multiple of crush apertures and the minor axis is equivalent to the major axis.

A further embodiment of any of the foregoing embodiments of the present disclosure includes a split line that intersects the non-circular aperture along the major axis.

A further embodiment of any of the foregoing embodiments of the present disclosure includes a split line that extends through a retention tab.

A further embodiment of any of the foregoing embodiments of the present disclosure includes that the retention tab is rectangular for receipt into a rectangular aperture.

A further embodiment of any of the foregoing embodiments of the present disclosure includes that the retention tab is arrow-shaped in cross-section.

A further embodiment of any of the foregoing embodiments of the present disclosure includes that the retention tab comprises a grommet mistake proof feature.

A further embodiment of any of the foregoing embodiments of the present disclosure includes that the retention tab comprises two parts separated by a space such that the parts are compressed when received through the rectangular aperture.

A clamp assembly according to one disclosed non-limiting embodiment of the present disclosure includes a cage that interfaces with the base, the cage defines at least one aperture; a grommet comprising a non-circular aperture with a multiple of crush apertures defining an arc at least partially around a major axis the non-circular aperture, a grommet retention tab received into the aperture; and a fastener that passes through the base, the cage and the grommet to retain the cage to the base and contain the grommet therebetween.

A further embodiment of any of the foregoing embodiments of the present disclosure includes a tab that extends from the cage that interfaces with a slot in the base.

A further embodiment of any of the foregoing embodiments of the present disclosure includes that the cage surrounds three sides of the grommet, the retention tab comprises a grommet mistake proof feature that aligns with a bracket mistake proof feature.

A further embodiment of any of the foregoing embodiments of the present disclosure includes that the grommet is manufactured of a silicon.

A further embodiment of any of the foregoing embodiments of the present disclosure includes a sleeve which defines a distance between the cage and the base, the fastener located through the sleeve.

A method of supporting a wiring harness within a clamp assembly for a gas turbine engine according to one disclosed non-limiting embodiment of the present disclosure includes installing a wiring harness through a non-circular aperture with a multiple of crush apertures defined in an arc at least partially around a major axis of the non-circular aperture; and compressing the grommet to compress the multiple of crush apertures to retain the wiring harness within the non-circular aperture.

A further embodiment of any of the foregoing embodiments of the present disclosure includes that installing the wiring harness comprises installing the wiring harness though a split line.

A further embodiment of any of the foregoing embodiments of the present disclosure includes that compressing the grommet comprises tightening a fastener to compress the non-circular aperture along a minor axis.

A further embodiment of any of the foregoing embodiments of the present disclosure includes controlling the compressing with a sleeve that passes through the grommet.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
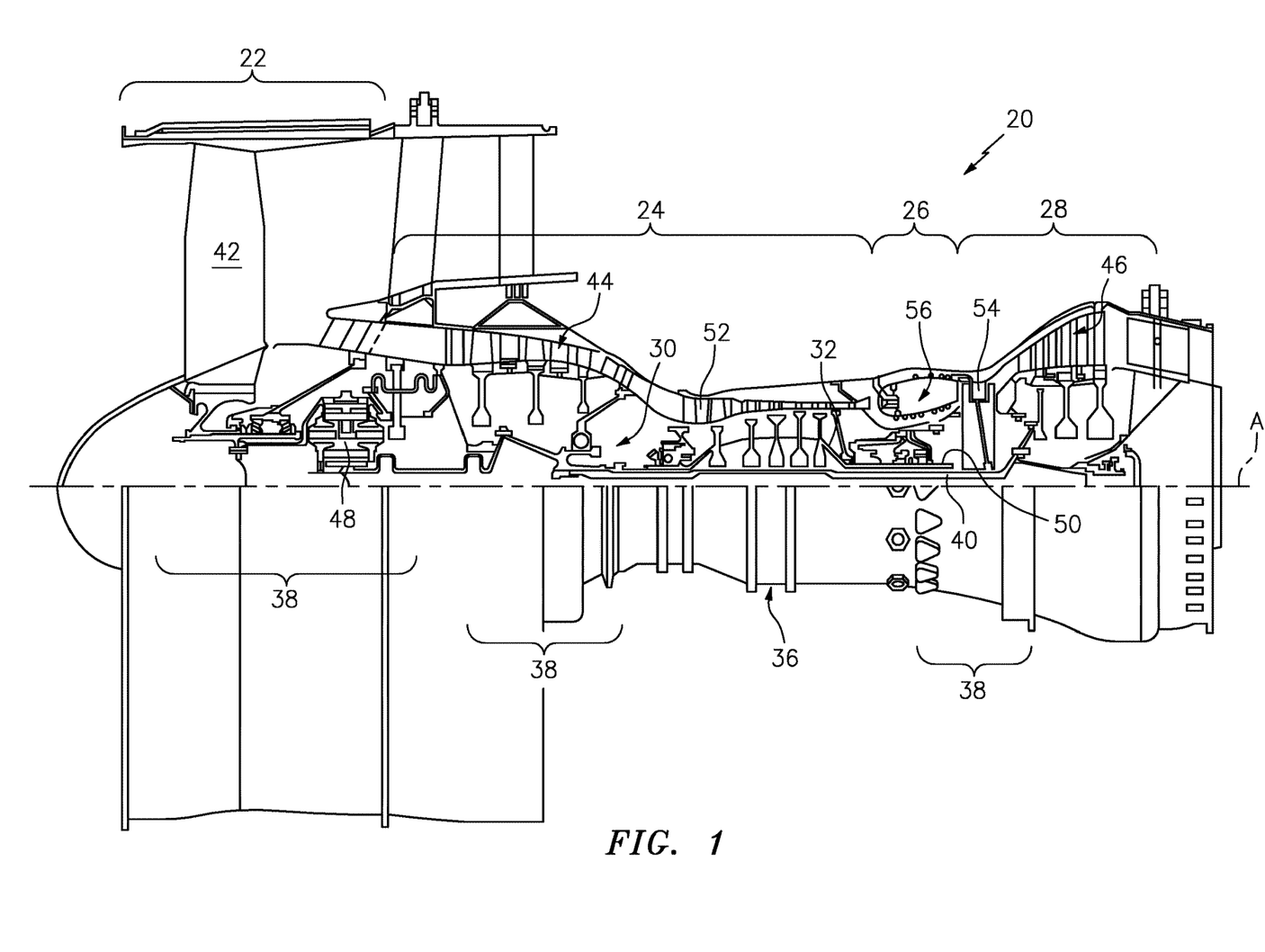
FIG. 1 is a schematic cross-section of an example gas turbine engine architecture.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. The fan section 22 drives air along a bypass flowpath while the compressor section 24 drives air along a core flowpath for compression and communication into the combustor section 26, then expansion through the turbine section 28. Although depicted as a turbofan in the disclosed non-limiting embodiment, it should be appreciated that the concepts described herein may be applied to other engine architectures such as turbojets, turboshafts, and three-spool (plus fan) turbofans.

The engine 20 generally includes a low spool 30 and a high spool 32 mounted for rotation about an engine central longitudinal axis X relative to an engine static structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 that drives the fan 42 at a lower speed than the low spool 30. An exemplary reduction transmission is an epicyclic transmission, such as a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis X which is collinear with their longitudinal axes.

Core airflow is compressed by the LPC 44, then the HPC 52, mixed with the fuel and burned in the combustor 56, then expanded over the HPT 54 and the LPT 46 which rotationally drive the respective high spool 32 and the low spool 30 in response to the expansion. The main engine shafts 40, 50 are supported at a plurality of points by bearings 38 within the static structure 36.

Figure 2:
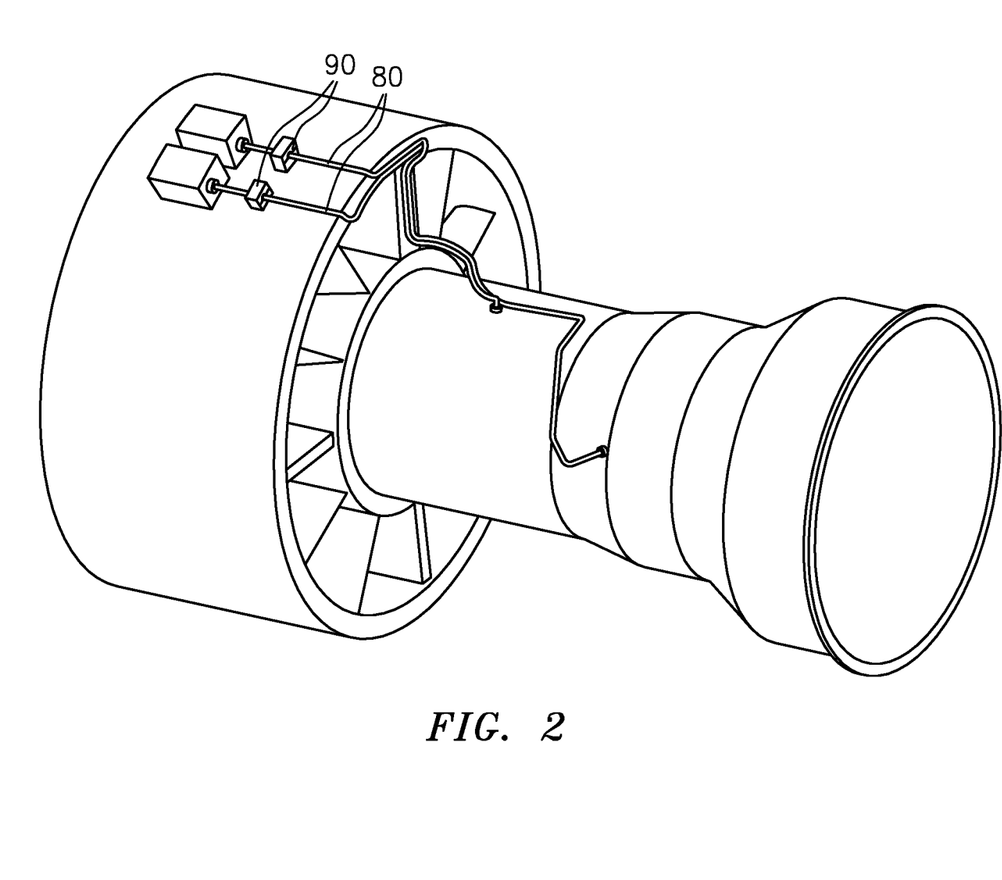
FIG. 2 is a perspective view of the gas turbine engine illustrating an example wire harness mounted thereto by a clamp assembly.
Figure 3:
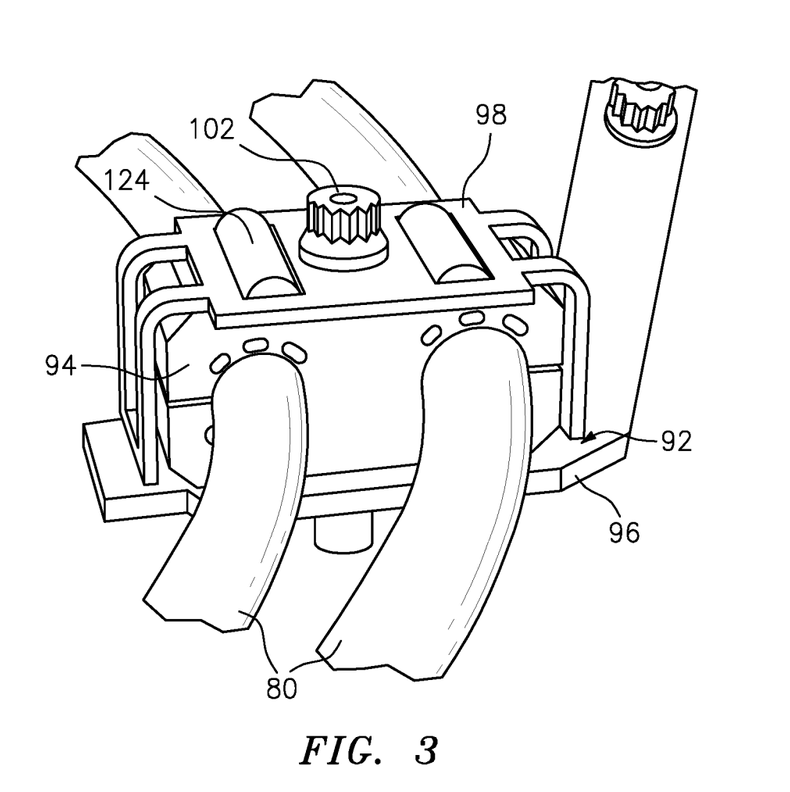
FIG. 3 is a perspective view of the clamp assembly.

With reference to FIG. 2, one or more electrical wiring harnesses 80 are secured to the gas turbine engine 20 by one or more clamp assemblies 90 (See also FIG. 3). The clamp assemblies 90 may be attached to the engine case structure or other location on or within the gas turbine engine 20. Although electrical wiring harnesses 80 are primarily disclosed herein, it should be appreciated that other conduits may likewise be retained.

Figure 4:
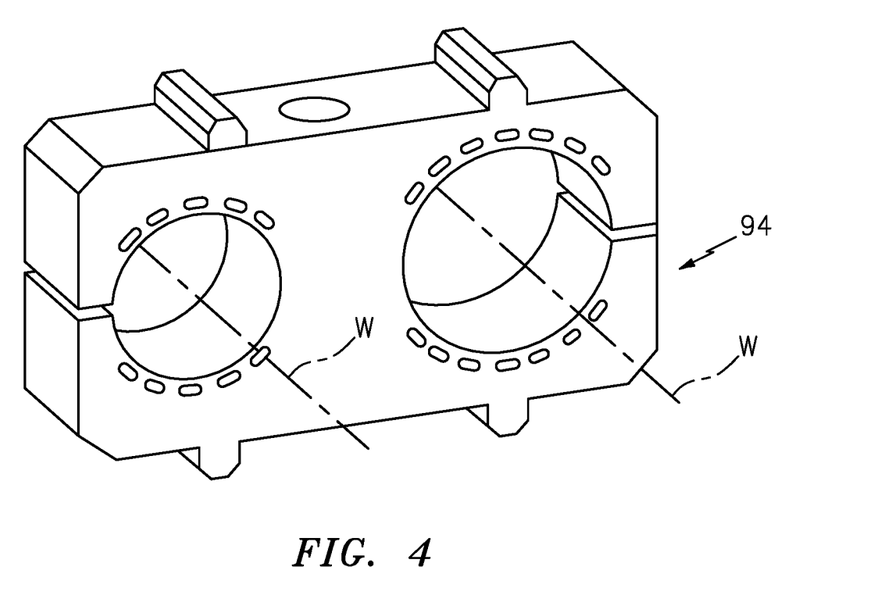
FIG. 4 is a perspective view of an example grommet.
Figure 5:
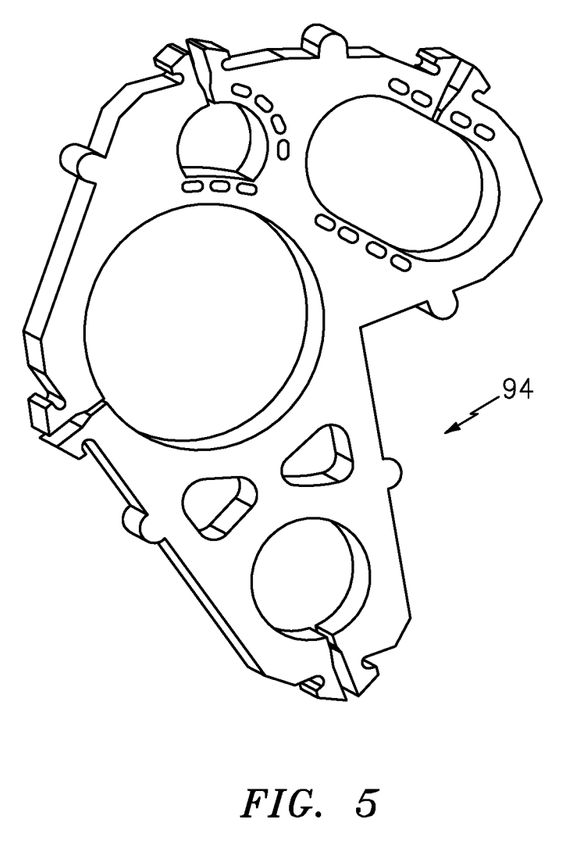
FIG. 5 is a perspective view of another example grommet.

Each clamp assembly 90 generally includes a bracket assembly 92 that retains a grommet 94 that receives one or more wiring bundles 82 of the electrical wiring harnesses 80. In the illustrated embodiment, the grommet 94 is generally rectilinear (See also FIG. 4), however, other shapes (See for example FIG. 5) will likewise benefit herefrom. The grommet 94 may be manufactured of resilient material such as silicon. The bracket assembly 92 includes a base 96 and a cage 98 that interfaces with the base 96. The cage 98 may generally include two sidewalls and a bridge member that surrounds three sides of the grommet 94. That is, the cage 98 may be generally "[" shaped (FIG. 6) and includes a tab 100 at each end of the sidewall such that the sidewalls abut the base and the tab 100 passes at least partially through the base 96. Each tab 100 is received within a respective slot 102 (two shown) in the base 96 (FIG. 7). Cage deformation from grommet compression loads does not allow the tabs 100 to disengage from the base slots 102 under max payload.

Figure 6:
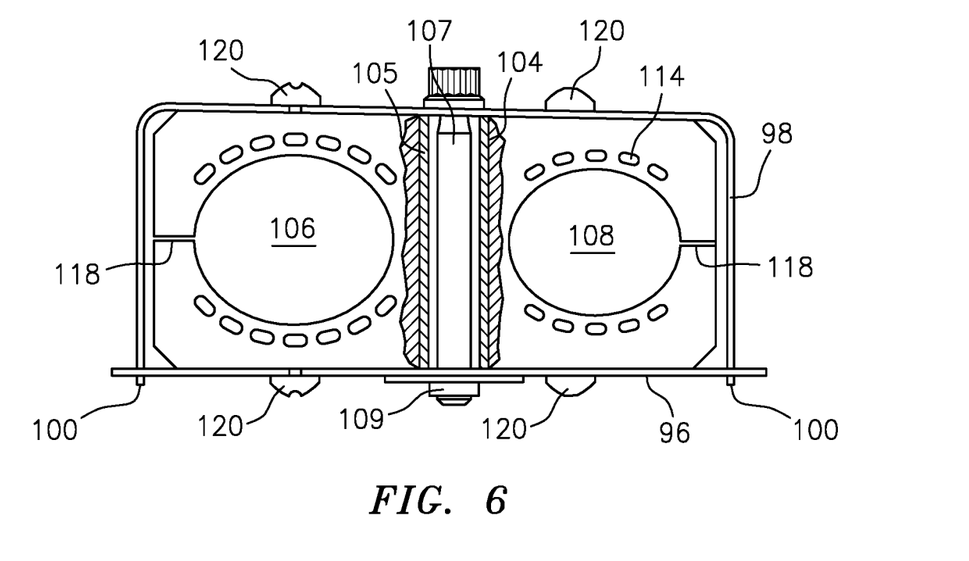
FIG. 6 is a front view of the clamp assembly.
Figure 7:
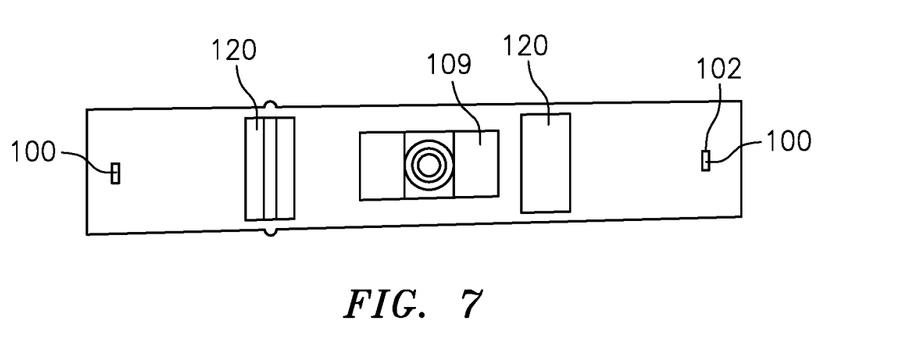
FIG. 7 is a bottom view of the clamp assembly.

With reference to FIG. 6, a fastener 107 passes through the base 96, the grommet 94, and the cage 98 to compress the grommet 94 therein. In the illustrated embodiment, a fastener passage 104 is located between a first and a second wire harness aperture 106, 108. The fastener 107 is received within a nut plate 109 that may be welded or otherwise attached to the base 96. A sleeve 105 may be located within the fastener passage 104 to control the compression of the grommet 94 by the fastener 107 (FIG. 6).

Figure 9:
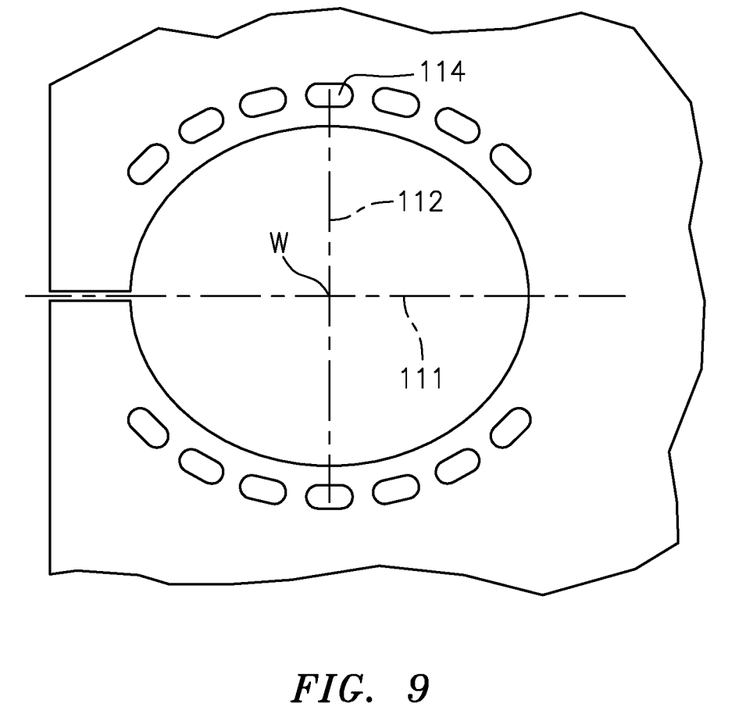
FIG. 9 is a front view of an oval wire harness aperture of the clamp assembly.

The first and the second wire harness aperture 106, 108 of the grommet 94 may be may be non-circular such as oval, racetrack, circular, rectilinear, triangular or other shape. A major axis 111 and a minor axis 112 (FIG. 9) of the non-circular apertures are defined in response to a diameter of the respective wiring bundle 82 received therethrough along a wire axis W. The oval shape provides additional room for electrical harness/cable diameter variation. In addition, grommet deflections in the major axis of the oval shape are minimized for crush sandwich grommet designs. For example:

A multiple of crush apertures 114 are defined at least partially around the first and the second wire harness aperture 106, 108 along the major axis 111. The multiple of crush apertures 114 and the first and the second wire harness aperture 106, 108 may be shaped by waterjet cutting, molding or other. That is, the multiple of crush apertures 114 and the first and the second wire harness aperture 106, 108 are cut into the relatively soft grommet 94. The crush apertures 114 may be oval, racetrack, circular, rectilinear, triangular or other shape to accommodate the compression of the grommet 94 to grip the wiring bundle 82. The crush apertures 114 allow for an increased crush force which increases the grip on the wiring bundle 82 in apertures 106, 108 to support harness weight and minimize creep that could result in loss of clearance to adjacent hardware and thus chafing of the wiring bundle 82.

The multiple of crush apertures 114 may be arranged in an arc around the first and the second wire harness aperture 106, 108. In one embodiment, the multiple of crush apertures 114 are each sized with respect to the minor axis 112 to be equivalent to the major axis 111. That is, the minor axis 112 plus the thickness of the crush apertures 114 are about equivalent to the major axis 111. The grommet 94 includes a split line 118 (FIG. 6) that intersects the respective first and the second wire harness aperture 106, 108 to install the respective wiring bundle 82.

The typical maximum minor axis 112 is minimum theoretical tolerance harness diameter−minimum interference diametrical interference×(2×the ligament height). The minimum diametrical interference between the minor axis 112 and the wire harness diameter may be between 0.01-0.07 inches (0.25-1.8 mm). Theoretical tolerance harness diameter is the calculated averaged harness diameter tolerance based on harness wire and cable construction utilizing the guidelines from NASA Tech Brief MSC-16378. The nominal and minimum minor axis are profile tolerance from the maximum minor axis. The minimum major axis 111 may be generally equivalent to 80% Maximum harness diameter capacity of the wiring bundle 82. In one example, the major axis=Nominal minor axis+0.125. The maximum harness diameter capacity of the wiring bundle 82 [To harness diameter] is minimum minor axis+2×crush hole height+20% of (Minimum minor axis+2×crush hole height) or the Maximum Theoretical harness tolerance diameter whichever is larger. In one example, The maximum theoretical harness diameter of the wiring bundle 82=minimum minor axis+2×crush hole height+20% of (Minimum minor axis+2×crush hole height). The interference between the minor axis 112 and the wire harness diameter may be between 0.01-0.07 inches (0.25-1.8 mm). The major axis 111 may be generally equivalent to the Maximum Theoretical harness diameter of the wiring bundle 82.

Figure 10:
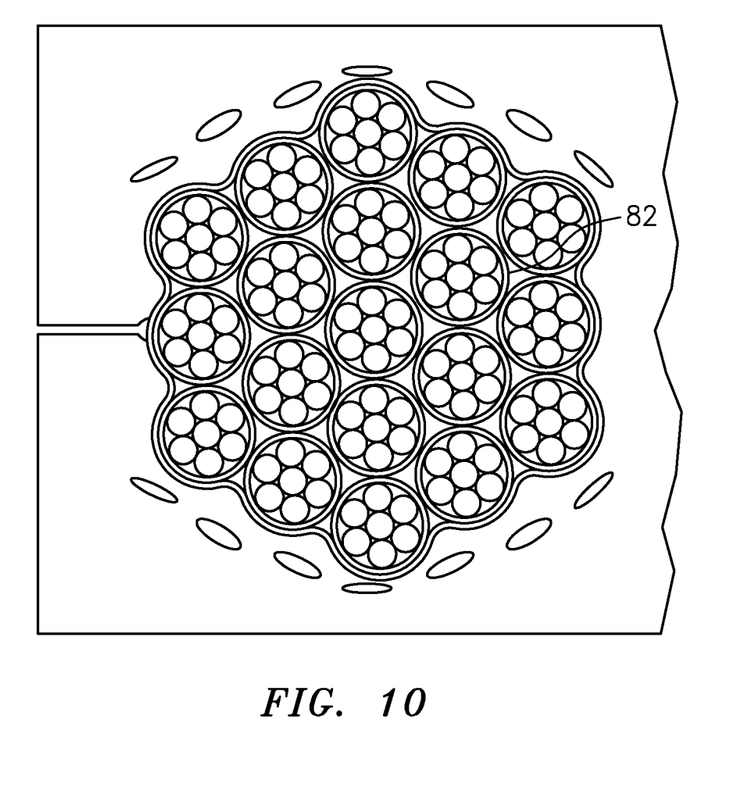
FIG. 10 is a front view of an oval wire harness aperture of the clamp assembly with a wire harness installed therein.

The independent crush apertures 114 provide added capacity for harness and cable diameter and irregular shape variation (FIG. 10). That is, the independent crush apertures 114 of the grommet 94 compensates for irregular shaped electrical wiring harnesses 80. The minor axis 112 is in the crush direction of the grommet 94. The major axis 111 provides the space for harness growth with minimal crush force. The major axis 111 is in the direction for which the electrical harness/cable is installed through the slot 118. The independent crush apertures 114 also minimize the likelihood of debris being adjacent to the wiring bundle 82 and chaffing the wiring harness. That is, collection of debris in the crush apertures 114 is separated from the wiring bundle 82. In one example, each of the multiple of crush apertures 114 are about 0.06 inches in height measured radially outwardly from a center of the wire harness aperture and are spaced about 0.05 inches from the outer diameter of the first and the second wire harness aperture 106, 108.

Figure 8:
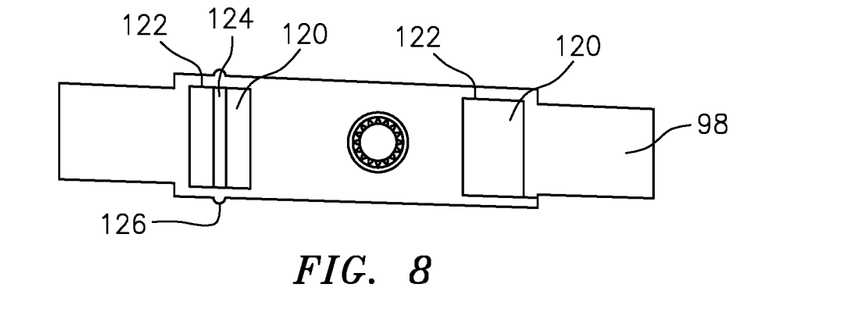
FIG. 8 is a top view of the clamp assembly.

With continued reference to FIGS. 6-8, the grommet 94 includes a multiple of retention tabs 120 that are received within respective apertures 122 in the bracket assembly 92 transverse to the wire axis W. In one example, the retention tabs 120 may be rectangular for receipt into a rectangular aperture 122. The retention tabs 120 facilitate management and retention of the elastic grommet 94 during assembly and operation. The retention tabs 120 eliminate separate sheet metal tab features which need be welded or riveted onto the bracketry.

One or more of the retention tabs 120 may include a grommet mistake proof-feature 124 such as a groove that corresponds with a bracket mistake proof feature 126 such as a protrusion that aligns with the grommet mistake proof-feature 124. The mistake proof-features assure proper orientation of the grommet 94.

Figure 11:
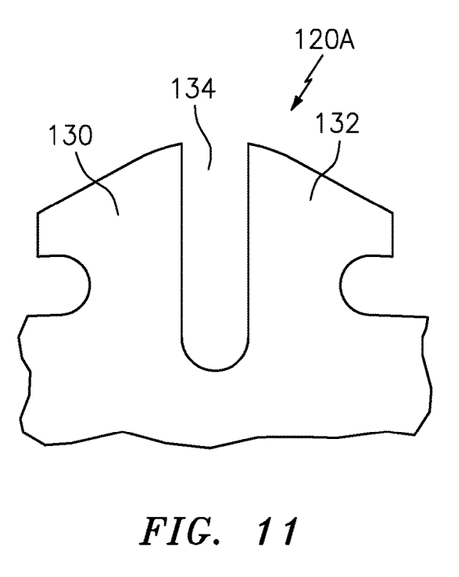
FIG. 11 is a sectional view of an example retention tab for the clamp assembly grommet.
Figure 12:
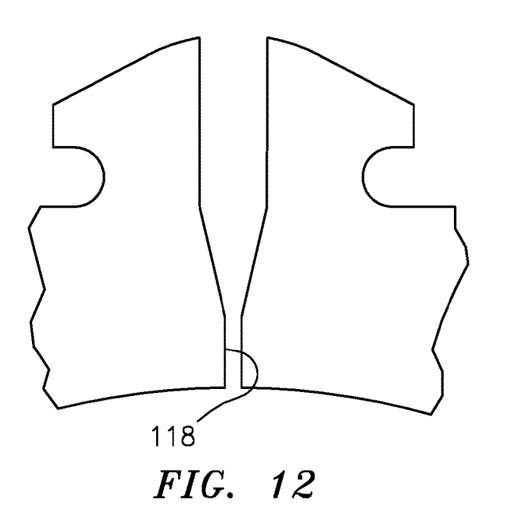
FIG. 12 is a sectional view of another example retention tab for the clamp assembly grommet.

With reference to FIG. 11, in another embodiment, the retention tabs 120A may be of a split arrow-head shape. The retention tab 120A includes two parts 130, 132, separated by a space 134 in cross section such that the parts 130, 132 are compressed when received into the bracketry. In another embodiment, the split line 118 is located though the retention tabs 120B (FIG. 12) to provide more material through which the split line passes.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed is:

1. A clamp assembly, comprising:
a grommet comprising a non-circular aperture with a multiple of crush apertures defined at least partially around the non-circular aperture, wherein the non-circular aperture defines a major axis and a minor axis, the major axis longer than the minor axis, the multiple of crush apertures arranged in an arc at least partially around the major axis, each of the multiple of crush apertures sized with respect to the minor axis such that the minor axis plus a thickness of each crush aperture is about equivalent to the major axis.

2. The assembly as recited in claim 1, wherein the non-circular aperture is an oval.

3. The assembly as recited in claim 1, wherein each of the multiple of crush apertures are racetrack in shape.

4. The assembly as recited in claim 1, further comprising a split line that intersects the non-circular aperture along the major axis.

5. The assembly as recited in claim 1, further comprising a split line that extends through a retention tab.

6. The assembly as recited in claim 5, wherein the retention tab is rectangular for receipt into a rectangular aperture.

7. The assembly as recited in claim 6, wherein the retention tab is arrow-shaped in cross-section.

8. The assembly as recited in claim 6, wherein the retention tab comprises a grommet mistake proof feature.

9. The assembly as recited in claim 6, wherein the retention tab comprises two parts separated by a space such that the parts are compressed when received through the rectangular aperture.

10. A clamp assembly, comprising:
a base;
a cage that interfaces with the base, the cage defines at least one aperture;
a grommet comprising a non-circular aperture with a multiple of crush apertures defining an arc at least partially around a major axis of the non-circular aperture, a grommet retention tab received into the aperture of the cage, wherein the non-circular aperture defines a major axis and a minor axis, the major axis longer than the minor axis, the multiple of crush apertures arranged in an arc at least partially around the major axis, each of the multiple of crush apertures sized with respect to the minor axis such that the minor axis plus a thickness of each crush aperture is about equivalent to the major axis; and
a fastener that passes through the base, the cage and the grommet to retain the cage to the base and contain the grommet therebetween, wherein the cage surrounds three sides of the grommet and a tab that extends from the cage that interfaces with a slot in the base.

11. The assembly as recited in claim 10, wherein the retention tab comprises a grommet mistake proof feature that aligns with a bracket mistake proof feature.

12. The assembly as recited in claim 10, wherein the grommet is manufactured of a silicon.

13. A clamp assembly, comprising:
a base;
a cage that interfaces with the base, the cage defines at least one aperture;
a grommet comprising a non-circular aperture with a multiple of crush apertures defining an arc at least partially around a major axis of the non-circular aperture, a grommet retention tab received into the aperture of the cage;

a fastener that passes through the base, the cage and the grommet to retain the cage to the base and contain the grommet therebetween; and a sleeve which defines a distance between the cage and the base, the fastener located through the sleeve.

14. A method of supporting a wiring harness within a clamp assembly for a gas turbine engine, comprising:

installing a wiring harness in a grommet through a non-circular aperture that defines a major axis and a minor axis, the major axis longer than the minor axis, with a multiple of crush apertures defined in an arc at least partially around a major axis of the non-circular aperture, each of the multiple of crush apertures sized with respect to the minor axis such that the minor axis plus a thickness of each crush aperture is about equivalent to the major axis; and compressing the grommet to compress the multiple of crush apertures to retain the wiring harness within the non-circular aperture.

15. The method as recited in claim 14, wherein installing the wiring harness comprises installing the wiring harness though a split line.

16. The method as recited in claim 14, wherein compressing the grommet comprises tightening a fastener to compress the non-circular aperture along a minor axis.

17. The method as recited in claim 16, further comprising controlling the compressing with a sleeve that passes through the grommet.

18. The assembly as recited in claim 1, wherein the minimum diametrical interference between the minor axis and a wire harness diameter may be between 0.01-0.07 inches (0.25-1.8 mm).

19. The assembly as recited in claim 1, wherein the minimum major axis is equivalent to 80% a maximum wire harness diameter.

20. The assembly as recited in claim 1, wherein the major axis is equivalent to a nominal minor axis+0.125.

21. The assembly as recited in claim 1, wherein the major axis is equivalent to a maximum harness diameter of a wiring bundle.

* * * * *